Jan. 13, 1970  D. H. REEVE  3,488,924
GAS SCRUBBER METHOD
Filed Oct. 24, 1967  2 Sheets-Sheet 1
INVENTOR.
DAVID H. REEVE
BY Brumbaugh, Free, Graves & Donohue
his ATTORNEYS
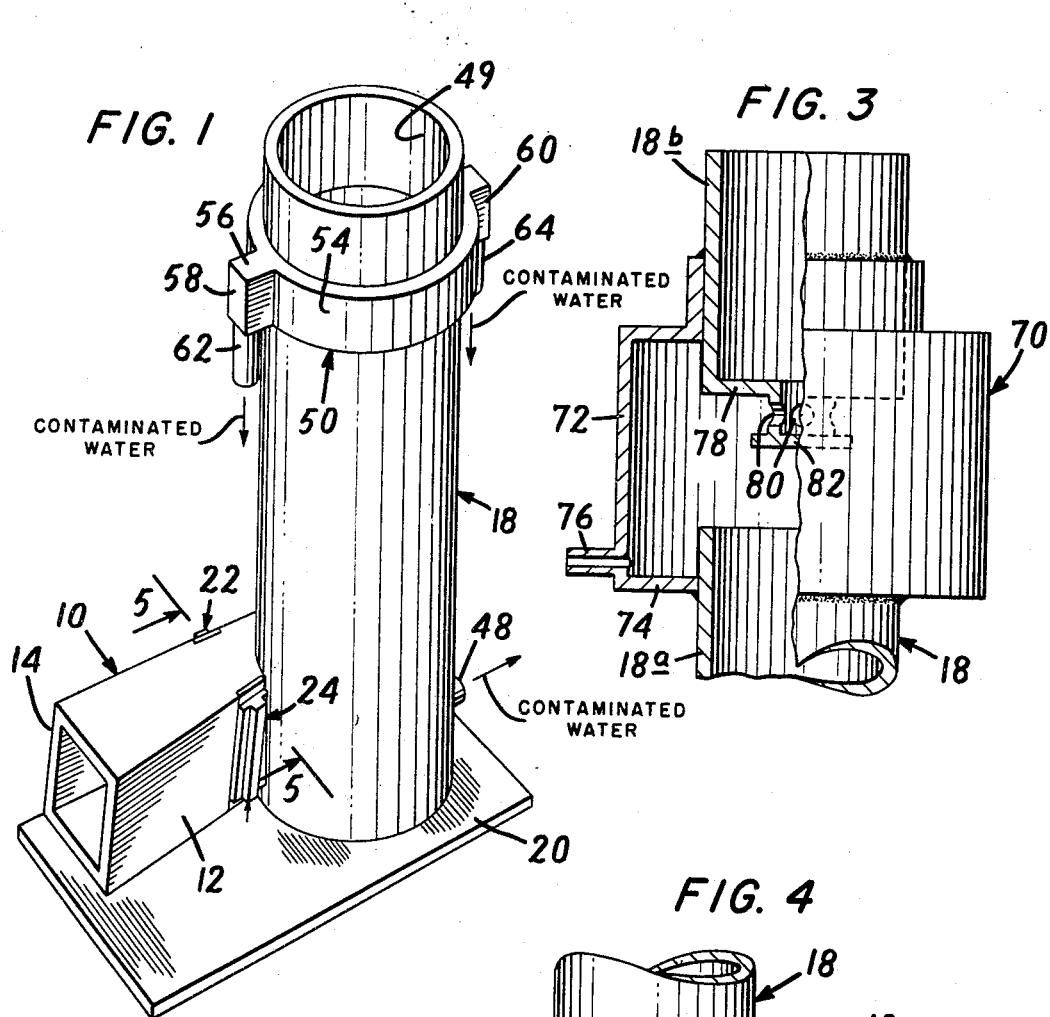
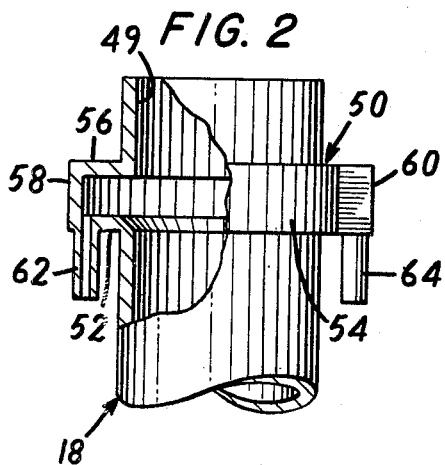
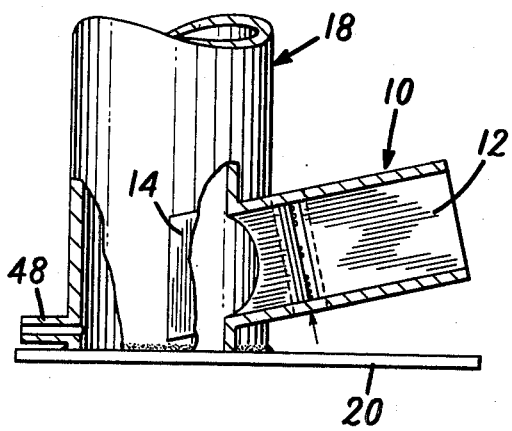

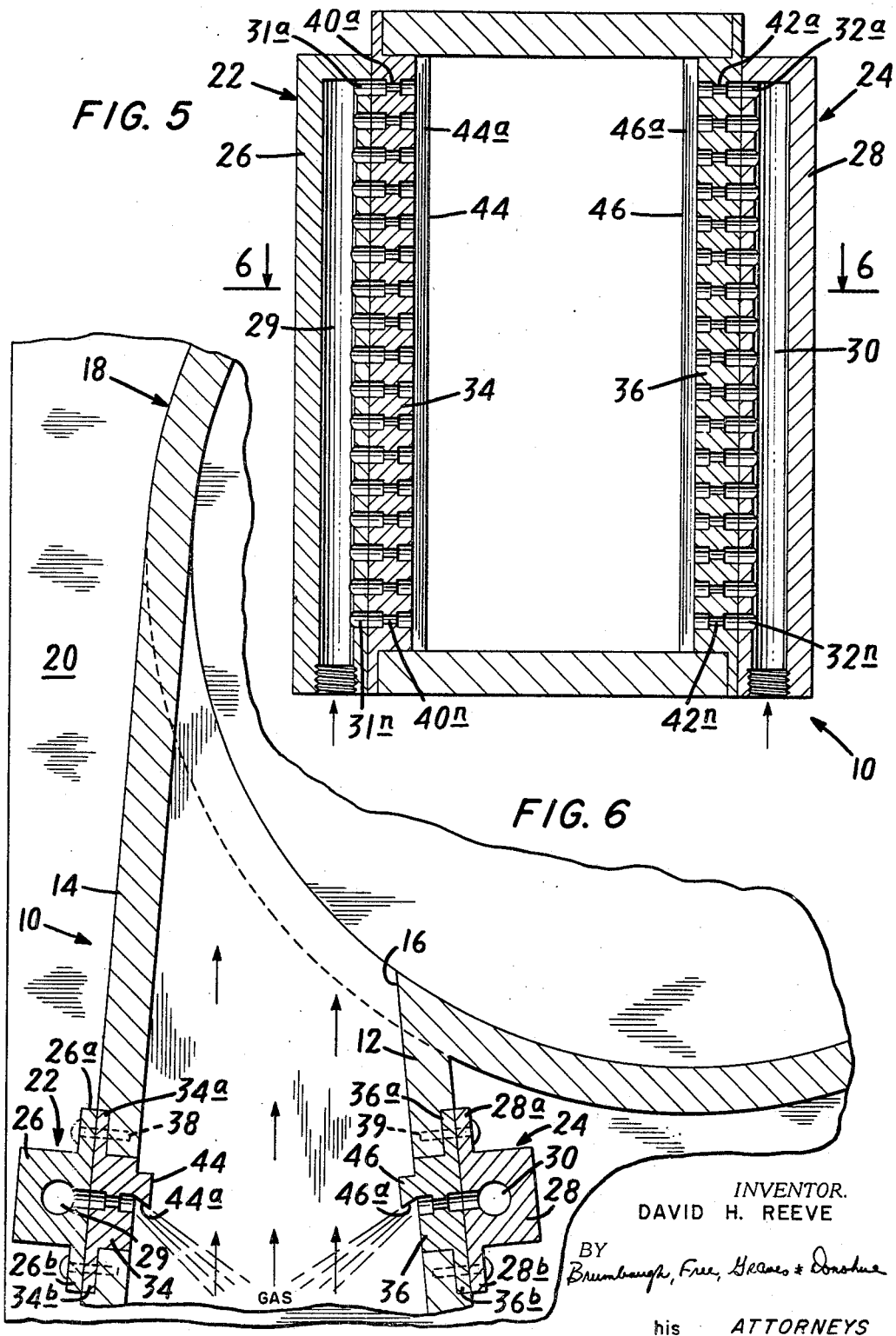

United States Patent Office 3,488,924
Patented Jan. 13, 1970

3,488,924
GAS SCRUBBER METHOD
David Hulsizer Reeve, Lakeland, Fla., assignor to Effluent Controls, Inc., Lakeland, Fla., a corporation of Delaware
Filed Oct. 24, 1967, Ser. No. 677,572
Int. Cl. B01d 47/02
U.S. Cl. 55—85      3 Claims

ABSTRACT OF THE DISCLOSURE

The method of contacting a contaminated gas with a wash liquid, centrifugally separating the wash liquid from the gas by tangential introduction into a zone, and recycling accumulated liquid to gas-liquid mixture entering the zone.

---

This invention relates to gas treatment methods for separating particulate matter from gases exhausted by incinerators, kilns, dryers and the like.

It is known to remove dust and other contaminants from exhaust gases by means of cyclonic and venturi gas scrubbers. However, these conventional scrubbers have certain disadvantages. For instance, the cyclonic scrubber is large and expensive, and it can operate effectively only with gases having relatively low maximum velocities. The venturi scrubber has low efficiency for particulate removal at low pressure drops, i.e., 1.5 to 10 inches water gauge, and can efficiently remove particulate matter only at relatively high pressure drops, i.e., 25 to 40 inches water gauge.

Accordingly, it is an object of the invention to provide a gas treatment method which overcomes these and other disadvantages of the prior art scrubbers method.

Another object of the invention is to provide a scrubber for gaseous effluent control which provides a high degree of contact between the contaminated gas and the scrubbing medium.

Also an object of the present invention is to maintain an efficient scrubbing operation with a minimum of internal structures.

A further object of this invention is to decrease the size of the scrubber of the method and the energy input in order to reduce installation and operating costs.

A still further object of this invention is to provide a process for scrubbing gases which provides a high degree of contact between the contaminated gas and a scrubbing medium and which provides a high degree of efficiency.

These and other objects are accomplished by the method of the invention. In this method, the contaminated gas stream is mixed with sprayed liquid, e.g., water, in an inlet duct having a tapered section for accelerating the contaminated gas. This gas inlet duct extends downwardly to and tangentially with a cylindrical chamber whereby energy in the gas-water mixture is imparted to water whirling in the lower portion of the cylindrical chamber. This whirling water recycles as a continuous sheet across the inlet duct. After the gas-water mixture is compressed and admixed with the recycling water, the entrained water and contaminants, e.g., dust, are separated from the gas stream by extremely high centrifugal forces. Due to the high superficial velocity, the whirling water spirals upwardly and is removed by means of drain boxes at the top portion of the cylindrical chamber. Clean, de-entrained air is removed from the top of the cylindrical chamber.

For a more complete understanding of the present invention, reference may be had to the accompanying drawings, in which:

FIGURE 1 is a perspective view of an illustrative scrubber apparatus arranged according to the present invention;

FIGURE 2 is a fragmentary elevational view, partly in section, of the upper portion of the FIGURE 1 apparatus;

FIGURE 3 is a fragmentary elevational view, partly in section, of an alternative configuration for the upper portion of the FIGURE 1 apparatus;

FIGURE 4 is a fragmentary elevational view, partly in section, of the lower portion of the FIGURE 1 apparatus;

FIGURE 5 is an enlarged cross-sectional view of the apparatus taken along line 5—5 of FIGURE 1 and looking in the direction of the arrows; and FIGURE 6 is an enlarged fragmentary sectional view of the apparatus taken along line 6—6 of FIGURE 5.

In a representative gas scrubber arranged according to the present invention, as shown in the drawings, the contaminated gases exhausted by an incinerator, kiln, dryer or the like are received by an inlet duct 10. The contaminant may be finely divided matter, e.g., dust. If the velocity of the exhaust gases is low, a fan or blower (not shown) may be employed at the input end of the duct 10 for increasing the velocity of the gases supplied to the duct. As will be apparent herebelow, alternative to the placement of a fan or blower at the input end of the duct is the positioning of an exhaust fan at the upper end of the scrubber where the decontaminated gas exits. Preferably, the gases received by the duct 10 flow at a velocity ranging between 1000 and 3000 feet per minute (f.p.m.). Under most scrubbing operations, duct and stack velocities of 1000 and 3000 f.p.m. are normal to the industry. Use of the method of the present invention at these operating conditions will allow it to easily fit into the existing plant operations for chemical gas absorption and for particulate removal where the particulate matter is 1 micron in diameter or above.

To provide a further gradual acceleration of the gases entering into the duct 10, the duct 10 comprises a pair of sidewalls 12 and 14 which converge in spaced relation from the input end of the duct 10 to the contracted outlet end of the duct which leads into the tangential inlet opening 16 of a centrifugal separator 18, here shown as a cylindrical chamber. Preferably, the velocity of the entering gases is increased to a superficial velocity ranging between 3000 and 10,000 f.p.m. As best shown in FIGURE 6, the duct 10 and the chamber 18 are of unitary construction and hence, the walls of the duct 10 form extensions of the wall of the chamber 18 such that the output opening of the duct 10 constitutes the tangential input opening 16 of the separator 18. Alternatively, the separator 18 and the duct 10 may be formed separately and, for this configuration, the walls of the duct 10 may be affixed to the corresponding wall of the chamber 18 in any known manner, such as for example by welding. The separator 18 also includes a base 20 which is displaced from the tangential input opening by a small, predetermined distance, as will be more fully explained hereinafter.

As best shown in FIGURE 4, the input end of the duct 10 is raised with respect to the contracted output end of the duct so that the duct slopes downwardly toward the cylindrical separator 18. Preferably, the duct is inclined at an angle ranging between 0 and 20° with respect to the base 20 of the cylindrical chamber 18. As will be explained hereinbelow, the provision of a downwardly sloping duct provides for greater contact between the liquid and the gases and the corresponding reatomization of the liquid, but results in a corresponding pressure drop in the chamber 18. However, this loss in pressure is more than offset by the increase in contact provided for in the crubber. However, to overcome this pressure drop, the velocity of the gases at the tangential input opening 16 may be reduced without materially affecting the efficiency of the separator.

As best shown in FIGURES 1, 5 and 6, a pair of water jackets 22 and 24 are mounted on the converging sidewalls 12 and 14, respectively, of the duct in proximity to the tangential inlet opening 16. The water jackets 22 and 24 comprise outer sections 26 and 28 having flanges 26a and 2b, and 28a and 28b, respectively, and central openings 29 and 30, respectively, extending along the extents of the sections. The outer sections further include a plurality of vertically spaced and generally cylindrically shaped transverse openings 31a . . . 31n and 32a . . . 32n, respectively, extending through the sections and communicating with the longitudinal openings 29 and 30.

Mounted in corresponding cutouts formed in the walls 12 and 14 of the duct 10 are the inner sections 34 and 36 of the water jackets. The configurations of these inner sections generally correspond to the configurations of the outer sections and, accordingly, include outer flanges 34a and 34b, and 36a and 36b, respectively. A plurality of vertically spaced bolts 38 and 39 are employed to affix the flanges 26a, 26b and 28a, 28b to the flanges 34a, 34b and 36a, 36b of the inner sections 34 and 36, respectively, and to the converging sidewalls 12 and 14 of the duct 10.

The inner sections 34 and 36 of the water jackets further include vertically spaced venturi-shaped openings 40a . . . 40n and 42a . . . 42n which communicate with the transverse openings 31a . . . 31n and 32a . . . 32n, respectively. The venturi-shaped openings constitute the jet bars or liquid spray nozzles of the present invention. The inner sections 34 and 36 of the water jackets are further provided with protrusions 44 and 46, respectively, which extend into the interior of the duct 10 and include sidewalls 44a and 46a which flare outwardly at a predetermined angle into the path of the gases. The sidewalls 44a and 46a of the protrusions extend over a substantial portion of the expanded sections of the venturi-shaped openings 40a . . . 40n and 42a . . . 42n and operate to deflect the washing liquid injected into the duct 10 by the nozzles into the path of the gases whereby the gases are wetted or liquified.

In this manner, there is a maximum amount of contact between the washing liquid and the particulate matter carried by the gases entering into the duct 10. This is true because the particles carried by the gases impinge at high velocities on the liquid spray and atomize or break up the liquid into droplets which are of very small size. These small size droplets, in turn, intercept the particles in the gases, wet them and cause them to separate from the gases. In the duct 10, there is a tendency to separate the larger particulate matter from the gases, the smaller sized particles remaining entrained in the gases. Further atomization of the liquid and the complete separation of the particulate matter from the gases takes place in the separator 18, as will be described hereinafter.

The washing liquid, which may be for example, water, is suplied under a predetermined pressure from a suitable source (not shown) such as a conventional water pump to the longitudinal openings 29 and 30. The pressure of the washing liquid entering into the openings of the outer sections of the venturi-shaped openings 40a . . . 40n and 42a . . . 42n is adjusted to correspond with the velocity of the gases flowing in the duct 10 and is ordinarily relatively minimal such as, for example, 10 to 20 p.s.i.g. Specifically, either the velocity of the contaminated gas entering the duct 10 or the pressure of the injected washing liquid is adjusted to provide maximum contact between the gas and the injected washing liquid without the gas blowing a hole in the liquid spray whereby a substantial portion of the gases would not be wetted. For example, where the velocity of the gas entering into the gas inlet duct 10 is in the order of 2500 f.p.m., water injected under a pressure of 20 p.s.i.g. is sufficient to provide for the wetting down of the entire gas and prevent the blowing of holes in the spray pattern.

The nozzles 40a . . . 40n and 42a . . . 42n are preferably venturi-shaped to make certain that an equal amount of water is sprayed into the gas inlet duct 10 by each of the nozzles so that a uniform wetting down or liquefaction of the gases takes place. As shown, water is supplied into the openings 29 and 30 of the outer sections 26 and 28, respectively, and the gas duct 10 through the nozzles 40a . . . 40n and 42a . . . 42n. Because the nozzles have venturi-shaped configurations, the flow of water is restricted at the throat of each nozzle so that the water is injected into the duct in equal amounts by all the nozzles to thereby avoid non-uniform injection of washing liquid into the gases. This result holds true whether or not the water is supplied to the longitudinal openings 29 and 30 through the top, bottom or middle portions of the sections 26 and 28. In addition, there is no loss of pressure of the liquid supplied by the nozzles 40a . . . 40n and 42a . . . 42n into the duct 10 in the expansion sections of the nozzles because substantially all the pressure is restored in the expansion sections, as is understood.

As above-mentioned, the wetted and high velocity gases are conveyed tangentially into the cylinder 18 through the contracted outlet end of the duct 10 at velocities which preferably range between 3000 and 10,000 f.p.m. This velocity is dependent upon the difficulty in scrubbing the contaminants from the gases and the allowable pressure drop in the separator 18. As is understandable, submicron dust requires a high impact ratio to cause particulate matter carried by the gases to impinge on the water sprayed into the duct 10 and, hence, requires a large gas velocity. Because of the declination of the duct 10 and the contraction at the outlet end of the duct, there is relatively substantial drop in the pressure of the gases entering into the separator 18. If high velocities are not used at the tangential input opening 16, due to the pressure drop caused thereby, more sprays may be placed in the water jackets 22 and 24 to pretreat the gases and enlarge the dust particles before entry into the separator 18.

Operating at a high range of velocities, such as 3000 to 10,000 f.p.m., is particularly advantageous where centrifugal separation of oily mists is being accomplished. Oils which have a very low water wettability need greater impact for maximum scrubbing efficiency, and this can be obtained at these higher velocities.

The tangential and downwardly directed entry of the liquefied gases into the chamber 18 causes the gases to spin while traversing the interior walls of the separator 18. As will be more fully described below, this creates a swirling motion in the liquefied and high velocity gases whereby the liquefied gases impart a portion of their energy to the liquid accumulated in the separator 18 whereby the liquid and the gases re-cross the input opening 16 several times before being conveyed upwardly from the opening in the separator 18. To make certain that the stream re-crosses the inlet opening, the opening 16 is displaced from the base 20 of the separator by a small distance. Preferably, the displacement between the opening 16 and the base 20 is generally less than or equal to the dimension of the diameter of the chamber 18. If this dimension is greater than the diameter of the chamber 18 the stream will not re-cross the tangential inlet opening 16 unless a substantial amount of liquid is maintained in the bottom portion of the chamber, which would necessarily add to the pressure drop in the separator 18.

A short distance above the base 20 of the chamber 18 there is provided a circular opening formed in the chamber for receiving a liquid discharge pipe 48. The discharge pipe 48 is provided to convey the contaminated liquid accumulated in the bottom of the chamber 18 either to a sewer or to a recycle tank for the water. Because of the positioning of the pipe 48, a small amount of contaminated water is accumulated in the bottom of the separator 18. The water accumulates in the separator 18 because a substantial portion of the particulate matter entrained in the gases entering the separator will have been completely wetted in the duct 10 and separated from the gases. The result is that a substantial portion of the liquefied gases contains contaminated liquid. The gases still contain a substantial amount of fine droplets which have collected with the small particles in the gases and these must be removed to complete the process, as will be more fully described.

This liquid maintained in the separator, however, is not static, but rather cycles and recycles as a continuous sheet across the tangential inlet opening 16. The whirling liquid has imparted thereto part of the energy of the liquefied gases entering into the separator 18. Depending upon the velocity of the entering gases, the water together with the gases may cross and re-cross the tangential inlet opening as many as 300 to 500 times a minute to effect a liquid-to-gas contact ratio as high as 230 gallons per 1000 c.f.m. of gas, e.g., 150 to 230 gallons per 1000 c.f.m. of gas. The recirculated liquid provides an extremely high liquid-to-gas contact ratio so that the re-atomization of the liquid takes place. This re-atomization or liquid break-up further causes the wetting down of the very fine particles contained in the entering gas stream so as to facilitate the separation of the liquid from the gases.

In many processes it is desirable to recover the solids material in a useful form as a thick slurry. The scrubbing media may be a chemical such as phosphoric acid where dilution with water would be undesirable. Therefore, the water would be retained in the cylindrical section of the scrubber apparatus 18 and continuously cycled to accomplish the major portion of the scrubbing of dust such as triple superphosphate. The fresh acid would be introduced through the jet bars 40a . . . 40n and 42a . . . 42n in very small quantities with a small bleed-off of slurry from the scrubber through the discharge pipe 48 so that the bulk of the scrubbing liquid is a slurry which continuously recycles until the solids content is built up to a satisfactory level for reuse in the process.

When scrubbing very fine particulate matter, particularly less than 1 micron, low pressure drop scrubbing is unsuccessful unless a large volume of liquid is used per thousand c.f.m. of gas. Normal liquid-to-gas ratios are 10 to 20 gallons per thousand c.f.m. and a scrubber operating at these liquid-to-gas rates must effect pressure drops of 30 to 40 inches of water to obtain effective collection of submicron particles. The high liquid-to-gas ratio of the scrubber of the present invention allows it to accomplish the same efficiency, utilizing 7 to 10 inches of pressure drop.

In the cylindrical chamber 18, the gases have a superficial velocity of between 1500 and 5000 f.p.m. and, preferably, a proportional pressure drop of 1.5 and 10.0 inches. A preferred velocity for the liquid is 2500 f.p.m. with a relatively low pressure drop of between 4 to 8 inches. Superficial velocities in the entrainment separator section of the scrubber will be as low as 1500 f.p.m. when a material which creates foam must be scrubbed. Where the scrubber is used for liquid particulate entrainment separation by chemical absorption, velocities up to 5000 f.p.m. are beneficial to separation and scrubbing.

Due to the centrifugal force and the velocity of the gases, the contaminated liquid is partially forced or totally forced up the walls of the cylindrical separator 18. The effect of the centrifugal force is to cause the fine droplets carried by the gases to move transversely of the gas flow toward the boundary of the gases, which is the wall of the separator, where they may be collected and withdrawn along with the intercepted matter. In other words, a further scrubbing action takes place along the walls of the chamber 18 so as to separate the contaminated liquid droplets from the gases. At a predetermined height, the gases will have been completely separated from the contaminants. Above this height, the separator is provided with an outlet opening 49 which passes the separated decontaminated gases either directly to the atmosphere or to the atmosphere through an intermediate duct, such as an exhaust stack.

As best shown in FIGURES 1 and 2, below the outlet opening 49, the upper portion of the separator 18 includes an enlarged diameter cylindrical member 50 extending around the walls of the chamber 18. The member 50 is provided to collect the contaminated liquid swept up through the separator 18. In this regard, the member includes a beveled bottom wall 52 which extends from the wall of the separator 18 to the sidewall 54 of the member and an upper wall 56 which extends from the separator wall to the sidewall 54. Formed on opposite sides of the member 50 are a pair of hollow upright flanges 58 and 60 having longitudinal openings formed therein which communicate with the interior of the chamber 18. Mounted in the flanges 58 and 60 are discharge pipes 62 and 64, respectively, for conveying the collected contaminated liquid to either the above-mentioned recycle tank or to the above-mentioned sewer. It can be seen that by beveling the bottom wall 52 of the member 50, the collected liquid tends to drain off into the pipes 62 and 64 rather than to accumulate on the wall and fall back into the separator 18.

The member 50 is preferably positioned near the outlet opening 49 of the separator and displaced from the base 20 of the separator by a distance equal to between two and ten times the dimension of the diameter of the separator. At this distance, substantially all the particulate matter, including matter of micron and submicron size, will have been wetted down and separated from the gases. Accordingly, at this juncture the gases exited through the opening 49 of the separator are free from contaminants.

In operation the contaminated gas stream entering into the duct 10, having been conditioned as required, such as by increasing the velocity of the gas stream, mixes intimately with curtains of water droplets that are injected by the venturi-shaped nozzles 40a . . . 40n and 42a . . . 42n into the path of the high velocity gases. The inlet duct 10 slopes downwardly into the tangential input opening 16 so that a portion of the energy in the liquefied gases is imparted to the whirling water phase located in the bottom of the separator 18. The whirling water and gases recycle as a continuous sheet across the inlet opening 16 and act as an extension of the opening. During this recycling, the liquefied gases are guided, compressed, mixed with the recycling water. By reason of the extremely high centrifugal forces, entrained water and contaminants tend to separate from the gases. Thereupon, with the aid of the high (2500 to 3500 f.p.m.) superficial velocity in the separator 18, the completely liquefied gases spiral upwardly to the collection member 50 wherein the entrained water and particulate matter are separated from the gases. The contaminated water is thereupon passed from the separator 18 through the discharge pipes 62 and 64 of the member 50 into a sewer or recycle tank. Clean de-entrained gases pass from the outlet opening 49 of the separator to the atmosphere or to an exhaust stack.

Referring now to FIGURE 3, there is represented a modification to the gas treatment apparatus illustrated in FIGURE 1. In this embodiment, the upper portion of the separator 18 is divided into two sections 18a and 18b. Affixed to these sections and surrounding the gap between the two sections is a generally cylindrical collection chamber 70 for collecting the liquid swept up through the separator 18. Mounted in the sidewall 72 immediately above the bottom wall 74 of the chamber is a liquid discharge pipe 76 for conveying the separated liquid to a recycle tank or to a sewer.

The section 18b of the separator includes a bottom wall 78 having a restricted central opening formed therein. Attached to the bottom wall 78 through an aperured and hollow support rod 80 is a circular deflector wall 82. It can be seen that the interior of the section 18b communicates with the cylindrical collection chamber 70 through the central opening formed in the bottom wall 78 thereof and the openings formed in the support rod 80.

With this modified embodiment, the swirling de-contaminated gas will be discharged to the atmosphere through the collection chamber 70, the rod 80 and the second section 18b of the separator. The contaminated water, however, if it is not swept to the wall of the chamber 70, will be deflected by the deflector plate 82 into the bottom wall 74 of the chamber 70. From the chamber 70, the liquid is discharged through the pipe 76, as above-explained.

Although the invention has been described herein with reference to specific embodiments, many modifications and variations therein will readily occur to those skilled in the art. For example, in either the FIGURE 1 or FIGURE 3 embodiment, additional collection chambers may be provided to make certain that all of the separated contaminated liquid is discharged into a sewer or recycle tank and not exhausted into the atmosphere. In addition, differently shaped water nozzles may be provided in the water jackets 22 and 24 for injecting washing liquid into the path of the contaminated gases. Also two or more water jackets may be longitudinally displaced along either or both the sidewalls 12 and 14 of the gas duct 10.

Thus, in accordance with this invention, a scrubber method has been provided which operates at a very high efficiency, namely, at least about 90% recovery of contaminant particles which are less than 1 micron in size, e.g., about 95 to 99% recovery of dust particles which have a median size of about 0.2 to 0.3 micron.

The following example is submitted to illustrate but not to limit this invention. Unless otherwise indicated, all parts and percentages in the specification and claims are based upon weight.

Example I

Two runs were made on a pilot plant scrubber of this invention. Samples of gas were taken in the inlet duct before any spraying (sample A) and in the exhaust outlet above the drain boxes (sample B) in order to determine the efficiency of the scrubber. The sampling procedures followed the methods described in Bulletin WO–50 (Western Precipitation Corporation), Air Pollution Manual of Industrial Hygiene Association (1960) and Source Sampling Manual of Florida State Board of Health (1965).

The following conditions were noted for Run No. 1: inlet duct velocity (first treating zone) of 1850 f.p.m.; tangential inlet velocity (second treating zone) of 8380 f.p.m.; superficial velocity in cylindrical chamber (third treating zone) of 2630 f.p.m.; and overall pressure drop in cylindrical chamber (third treating zone) of 5.45 inches. The following conditions were also noted for Run No. 2: inlet duct velocity of 1070 f.p.m.; tangential inlet velocity of 4800 f.p.m.; superficial velocity in cylindrical chamber of 1510 f.p.m.; and overall pressure drop in cylindrical chamber of 7.35 inches. The test results and other conditions are indicated in Table I.

TABLE I

TOTAL PARTICULATE EMISSIONS

| | Run No. | Grains/cu. ft., dry gas, 20° C., 1 atm. | Lbs./hr. | Percent Efficiency Via— | | Medium diameter ($\mu$) | Percent <0.90$\mu$ |
|---|---|---|---|---|---|---|---|
| | | | | Grains/ cu. ft. | Lbs./hr. | | |
| Sample: | | | | | | | |
| A | 1 | 1.0 | 1.1 | | | 0.26 | 99.9 |
| A | 2 | 4.2 | 4.4 | | | 0.22 | 99.86 |
| B | 1 | 0.014 | 0.011 | 98.7 | 99.0 | 0.21 | 99.9 |
| B | 2 | 0.10 | 0.08 | 97.6 | 98.2 | 0.23 | 99.6 |

TOTAL PARTICULATE DETERMINATION

| | Run No. | Grams | Grains | Vstd-Metered Gas Vol. (dry, 20° C., 1 atm.) cu. ft. | Grains/ cu. ft. | Lbs./hr. |
|---|---|---|---|---|---|---|
| Sample: | | | | | | |
| A | 1 | 0.997 | 15.4 | 14.8 | 1.04 | 1.09 |
| A | 2 | 3.665 | 56.6 | 13.6 | 4.16 | 4.35 |
| B | 1 | 0.0166 | 0.256 | 18.1 | 0.0141 | 0.0111 |
| B | 2 | 0.119 | 1.84 | 18.4 | 0.100 | 0.0786 |

STACK AND FLUE GAS CONDITIONS

| | Run No. | Flue Gas Temp., °F. | Avg. Vel. Head H (in. H₂O) | Vs. Flue Gas Velocity, f.p.s. | Flue Gas Moist., Percent by Volume | Flue Gas Vol. (as is), c.f.m. | Flue Gas Vol. (dry, 20° C., 1 atm.) c.f.m. |
|---|---|---|---|---|---|---|---|
| Sample: | | | | | | | |
| A | 1 | 160 | 1.08 | 66.2 | 29 | 204 | 122 |
| A | 2 | | | | 29 | | |
| B | 1 | 150 | 0.501 | 30.4 | 26 | 135 | 91.7 |
| B | 2 | | | | 23 | | |

This example demonstrates that the apparatus of the invention has very high efficiency, e.g., 98.7% and 97.8% when substantially all of the contaminating dust particles in the inlet duct have a size less than 0.90 micron with a median diameter of 0.21 and 0.23 micron, respectively.

What is claimed is:

1. A process for scrubbing gases to remove finely divided contaminant particles therefrom which comprises:
   (a) introducing the contaminated gas into a treating first zone;
   (b) spraying a washing liquid into the treating first zone to wet the contaminant particles in said gas and form a contaminated liquid;
   (c) increasing the velocity of the resulting gas and contaminated liquid mixture in the treating first zone;
   (d) discharging the gas and contaminated liquid mixture from the treating first zone tangentially into a treating second zone to separate centrifugally the gas from the contaminated liquid;
   (e) accumulating a residue of contaminated washing liquid in the treating second zone and recycling the contaminated liquid in the treating second zone to contact the gas and contaminated liquid mixture entering the treating second zone from said first zone to wet further the gas in said mixture;

(f) forcing the gas and contaminated liquid mixture from the treating second zone upwardly by centrifugal force into a separating third zone wherein the remaining portion of the contaminated liquid separated from the gas is collected;

(g) removing from the treating second zone excess contaminated liquid accumulated therein, and removing from the separating third zone the contaminated liquid collected therein; and (h) removing from the separating third zone the separated decontaminated gas.

2. The process according to claim 1 in which the contaminated gas introduced into the treating first zone has a velocity of about 1000 to 3000 f.p.m., the gas and contaminated liquid mixture from the treating first zone is discharged tangentially and downwardly into the treating second zone and the velocity thereof is about 3000 to 10,000 f.p.m., and the superficial velocity of the gas and the contaminated liquid mixture in the separating third zone is about 1500 to 5000 f.p.m. with a pressure drop of 1.5 to 10.0 inches.

3. The process according to claim 2 in which the particles of contaminant are less than one micron, the washing liquid sprayed into the treating first zone is sprayed under a pressure of about 20 p.s.i.g., the contaminated liquid accumulated in the treating second zone is recycled between about 300 to 500 times per minute to effect a liquid-to-gas ratio of as high as about 230 gallons per 1000 c.f.m. of gas and the separated decontaminated gas removed from the separating third zone has at least about 90% contaminant removed therefrom.

References Cited

UNITED STATES PATENTS

| 1,875,755 | 9/1932 | Noyes | 55—238 |
| 2,106,589 | 1/1938 | Bigger et al. | 55—205 |
| 2,604,185 | 7/1952 | Johnstone et al. | 55—238 |
| 2,621,754 | 12/1952 | Doyle | 261—118 |
| 3,093,468 | 6/1963 | Krochta | 55—238 |
| 3,201,919 | 8/1965 | Long | 55—459 |
| 3,212,235 | 10/1965 | Markant | 55—238 |
| 3,215,415 | 11/1965 | Stephens et al. | |
| 3,323,290 | 6/1967 | Stern | 55—238 |
| 3,350,076 | 10/1967 | Crommelin. | |

FOREIGN PATENTS 338,492  11/1930  Great Britain.

HARRY B. THORNTON, Primary Examiner

BERNARD NOZICK, Assistant Examiner

U.S. Cl. X.R

55—89, 92, 238, 257, 459; 209—211; 261—79, 118